(12) United States Patent
Linzer et al.

(10) Patent No.: US 7,417,670 B1
(45) Date of Patent: Aug. 26, 2008

(54) DIGITAL VIDEO CAMERA WITH BINNING OR SKIPPING CORRECTION

(75) Inventors: Elliot N. Linzer, Suffern, NY (US); Wilson Kwok, Santa Clara, CA (US)

(73) Assignee: Ambarella, Inc., Santa Clara, CA (US)

( * ) Notice: Subject to any disclaimer, the term of this patent is extended or adjusted under 35 U.S.C. 154(b) by 641 days.

(21) Appl. No.: 11/034,034

(22) Filed: Jan. 12, 2005

(51) Int. Cl.
*H04N 5/228* (2006.01)

(52) U.S. Cl. .................................................. 348/222.1

(58) Field of Classification Search .............. 348/222.1, 348/302, 294; 250/208.1
See application file for complete search history.

(56) References Cited

U.S. PATENT DOCUMENTS

| | | | |
|---|---|---|---|
| 6,801,258 B1 * | 10/2004 | Pain et al. ................. | 250/208.1 |
| 7,133,073 B1 * | 11/2006 | Neter .......................... | 348/272 |
| 2004/0085475 A1 * | 5/2004 | Skow et al. ................. | 348/362 |
| 2004/0165080 A1 * | 8/2004 | Burks et al. ............... | 348/222.1 |
| 2004/0246344 A1 * | 12/2004 | Voss et al. ................ | 348/220.1 |
| 2005/0041116 A1 * | 2/2005 | Tsukioka ................... | 348/229.1 |
| 2005/0226526 A1 * | 10/2005 | Mitsunaga ................... | 382/274 |
| 2006/0077269 A1 * | 4/2006 | Kindt et al. ................. | 348/294 |

OTHER PUBLICATIONS

Micron Technology, Inc., Boise, ID "½-Inch 3-Megapixel CMOS Active-Pixel Digital Image Sensor" data sheet, Rev C, Sep. 2004.

* cited by examiner

*Primary Examiner*—Tuan Ho
*Assistant Examiner*—Kent Wang
(74) *Attorney, Agent, or Firm*—Christopher P. Maiorana, PC

(57) ABSTRACT

A method of operation for a video camera and the video camera are disclosed. The method generally comprises the steps of (A) sensing an optical signal with a plurality of pixels to generate an input signal, wherein the sensing is capable of a pixel reduction by at least one of binning the pixels and skipping some of the pixels and (B) processing the input signal in order to reduce artifacts caused by the pixel reduction to generate an output signal.

18 Claims, 18 Drawing Sheets

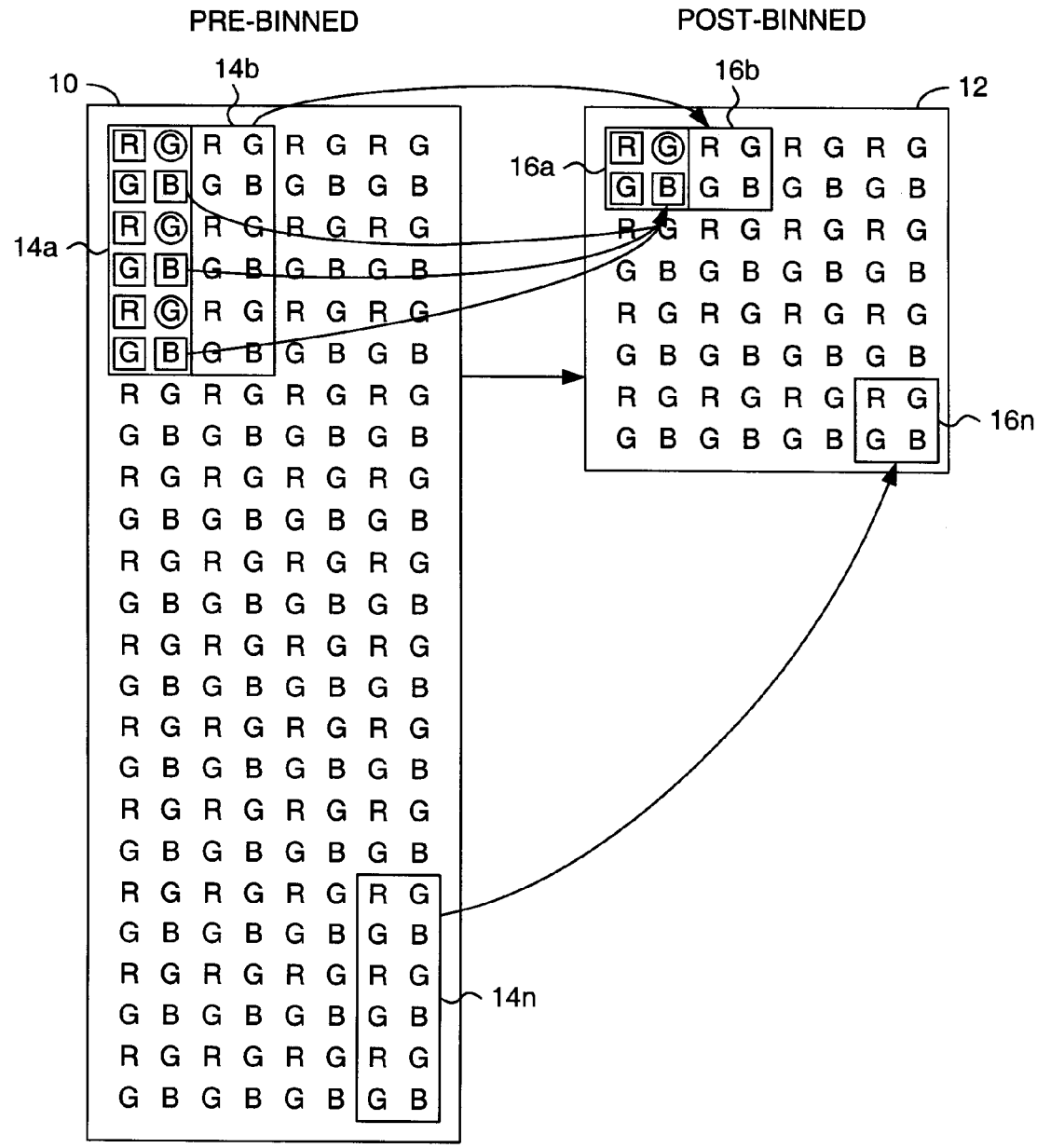
FIG. 1
(CONVENTIONAL)

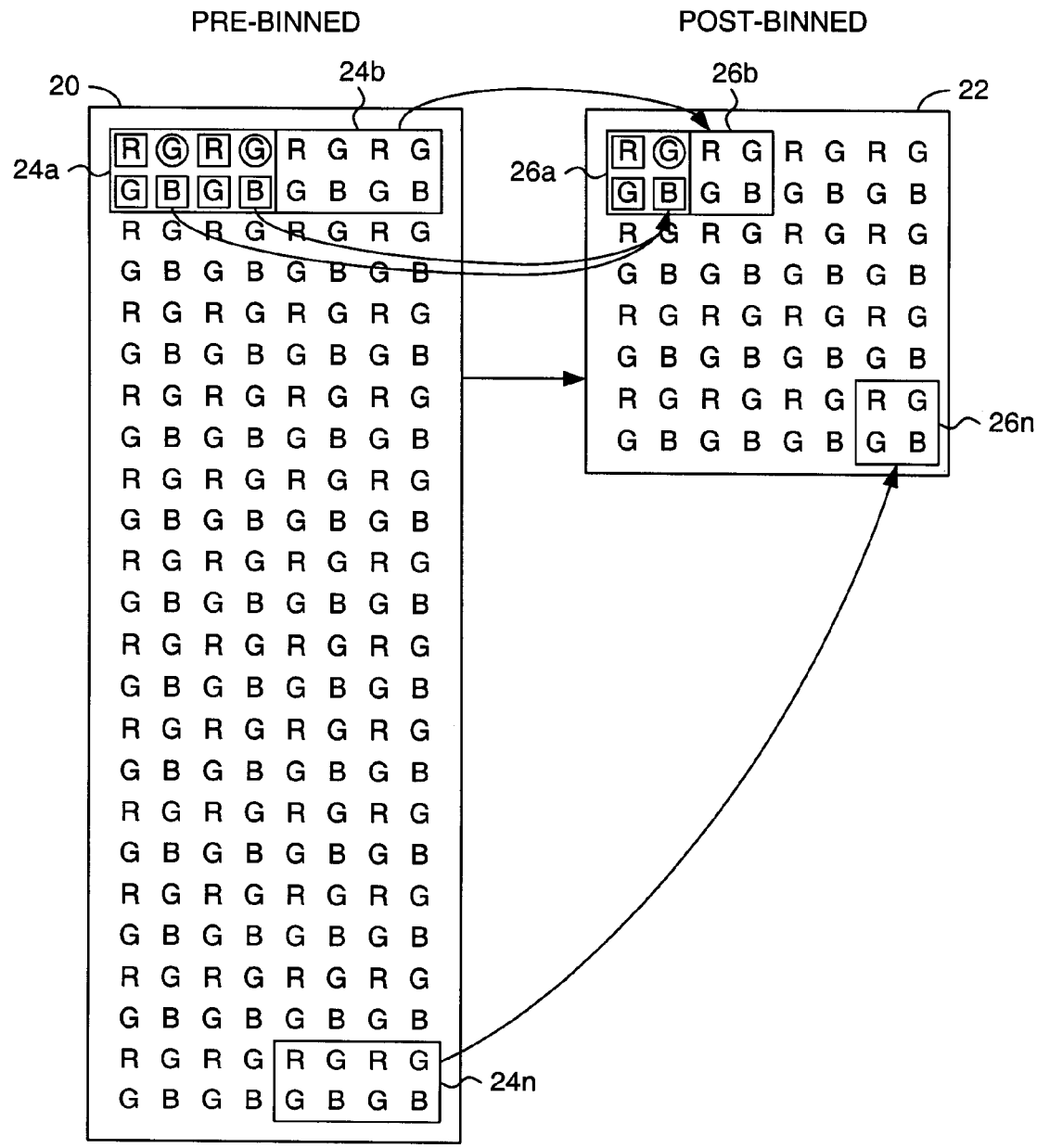
FIG. 2
(CONVENTIONAL)

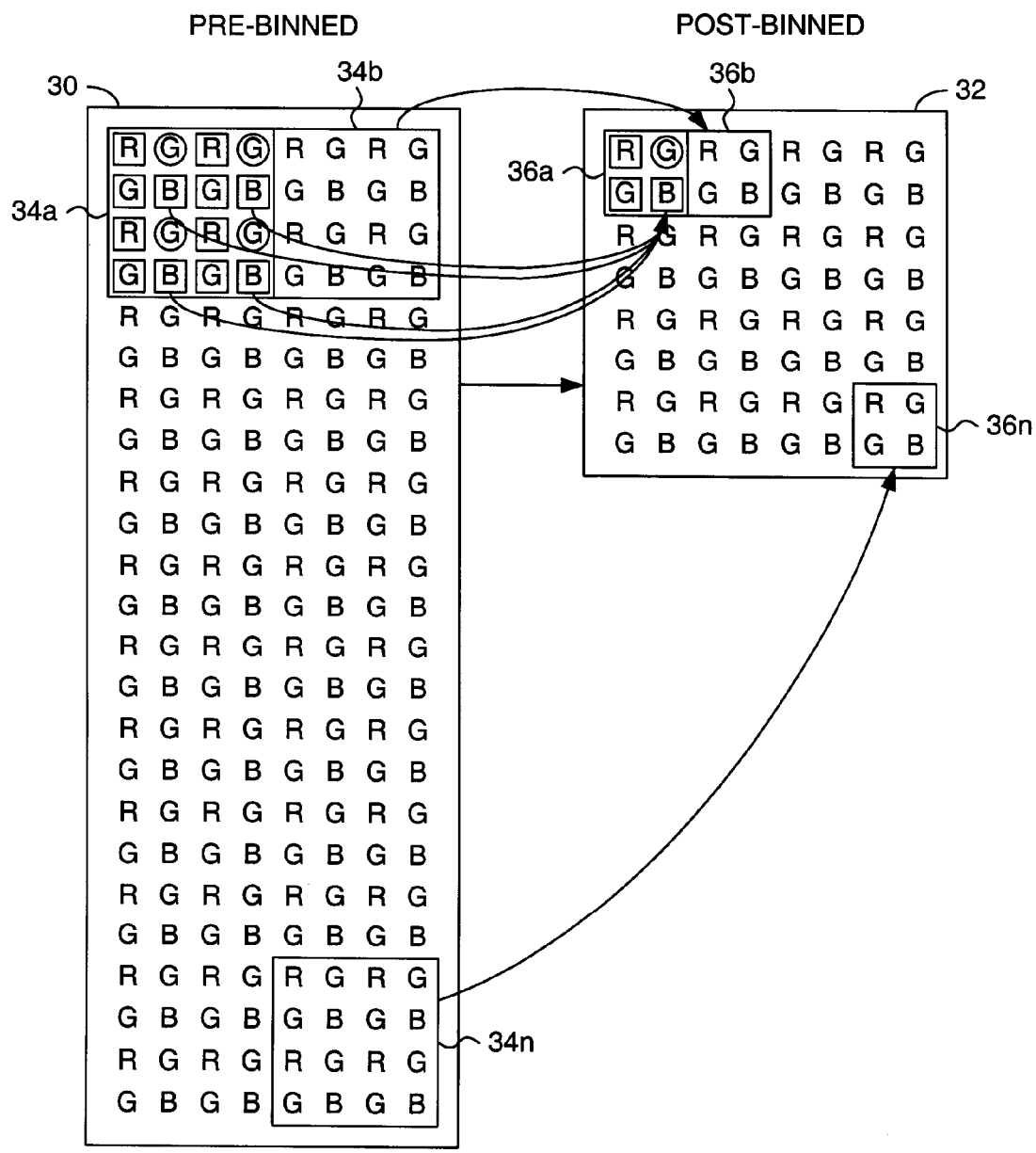
FIG. 3
(CONVENTIONAL)

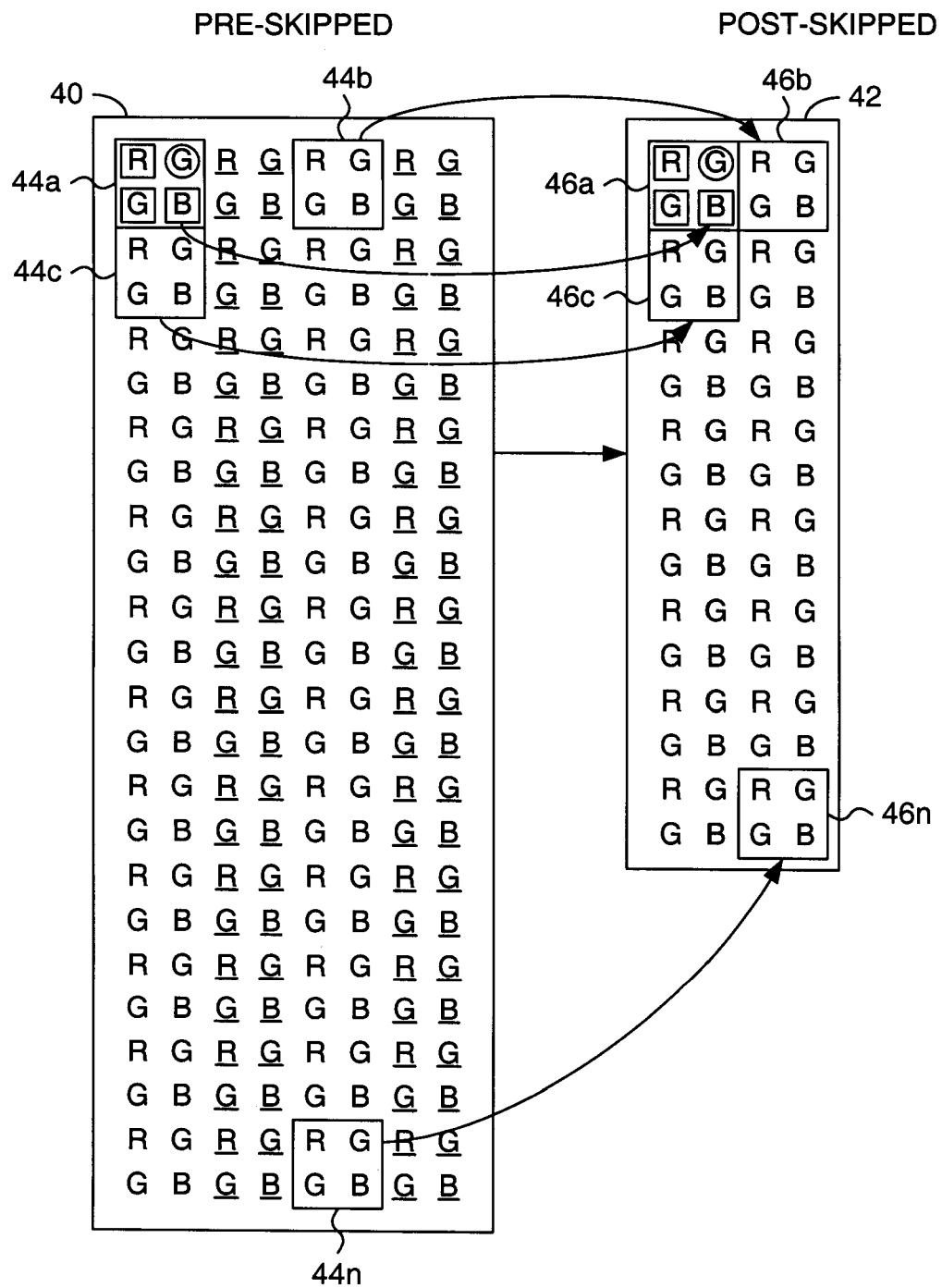
FIG.4
(CONVENTIONAL)

2X HORIZONTAL BINNING $$\begin{bmatrix} 5 & 4 & 3 & 4 & 5 \\ 4 & 2 & 1 & 2 & 4 \\ 3 & 1 & 0 & 1 & 3 \\ 4 & 2 & 1 & 2 & 4 \\ 5 & 4 & 3 & 4 & 5 \end{bmatrix}$$

FIG. 19

$$\begin{bmatrix} -1 & 0 & 1 \\ -1 & 0 & 1 \\ -1 & 0 & 1 \end{bmatrix}$$

FIG. 21

$$\begin{bmatrix} 1 & 1 & 1 \\ 0 & 0 & 0 \\ -1 & -1 & -1 \end{bmatrix}$$

DIGITAL VIDEO CAMERA WITH BINNING OR SKIPPING CORRECTION

FIELD OF THE INVENTION

The present invention relates to a method and/or architecture for video cameras generally and, more particularly, to a digital video camera with binning and/or skipping correction.

BACKGROUND OF THE INVENTION

Bayer pixels generated by an imaging sensor typically undergo a series of steps, including noise reduction, demosaicing and color space conversion, before being compressed into a compressed video signal. CMOS and CCD imaging sensors are not fast enough to output all of the available pixels in a video frame time (i.e., ⅙₀th to ½₅th of a second). In order to produce high frame rate video, the pixels are cropped, binned or skipped.

Cropping is done to frame a picture per a user command and has a side effect of reducing a number of pixels output by the sensor. Binning is a process where adjacent rows and/or columns of like-colored pixels are averaged. Skipping is a process of skipping pairs of rows and/or columns of pixels. Binning or skipping is done automatically by the electronics that controls the sensor to lower a pixel rate. As less cropping is performed, more binning or skipping is performed to keep the pixel rate below a maximum level.

The FIGS. 1-4 illustrate various binning and skipping possibilities. Each of the FIGS. 1-4 illustrate how pre-binned/pre-skipped (initial) pixels are mapped into a Bayer set of post-binned/post-skipped (modified) pixels. Each of the Bayer sets is defined as two green "G" pixels, a red "R" pixel and a blue "B" pixel. To aid in explaining the illustrations, boxes and circles identify each of the red, blue and green initial pixels used to generate a corresponding modified pixel. The two green pixels in each of the Bayer sets are distinguished with a box around one G pixel and a circle around the other G pixel. The boxed green pixels in the pre-binned/pre-skipped image are used to generate the boxed green pixel in the post-binned/post-skipped image. The circled green pixels in the pre-binned/pre-skipped image are used to generate the circled green pixel in the post-binned/post-skipped image. The boxed blue pixels in the pre-binned/pre-skipped image are used to generate the boxed blue pixel in the post-binned/post-skipped image. The boxed red pixels in the pre-binned/pre-skipped image are used to generate the boxed red pixel in the post-binned/post-skipped image. The post-binned and post-skipped pixels are commonly used to form a final image.

Referring to FIG. 1, a diagram of a conventional 3× vertical binning of an initial set 10 of pre-binned pixels to a modified set 12 of post-binned pixels is shown. Each group 14a-14n of twelve pre-binned pixels is converted into a single Bayer set 16a-16n of four post-binned pixels as illustrated.

Referring to FIG. 2, a diagram of a conventional 2× horizontal binning of an initial set 20 of pre-binned pixels to a modified set 22 of post-binned pixels is shown. Each group 24a-24n of eight pre-binned pixels is converted into a single Bayer set 26a-26n of four post-binned pixels as illustrated.

Referring to FIG. 3, a diagram of a conventional 2× horizontal and 2× vertical binning of an initial set 30 of pre-binned pixels to a modified set 32 of post-binned pixels is shown. Each group 34a-34n of eight pre-binned pixels is converted into a single Bayer set 36a-36n of four post-binned pixels as illustrated.

Referring to FIG. 4, a diagram of a conventional 2× horizontal skipping of an initial set 40 of pre-skipped pixels to a modified set 42 of post-skipped pixels is shown. Each group 44a-44n of four pre-skipped pixels is converted into a single Bayer set 46a-46n of four post-skipped pixels as illustrated. The pre-skipped pixels not used to generate the modified set 42 are underlined.

Binning and skipping introduce artifacts. The artifacts generated by skipping are commonly worse than the artifacts generated by binning. Therefore, when a sensor supports binning and skipping, binning is often preferred. Nonetheless, even binning artifacts are substantial.

SUMMARY OF THE INVENTION

The present invention concerns a method of operation for a video camera and the video camera. The method generally comprises the steps of (A) sensing an optical signal with a plurality of pixels to generate an input signal, wherein the sensing is capable of a pixel reduction by at least one of binning the pixels and skipping some of the pixels and (B) processing the input signal in order to reduce artifacts caused by the pixel reduction to generate an output signal.

The objects, features and advantages of the present invention include providing a digital video camera with binning and/or skipping correction that may (i) reduce artifacts introduced by pixel binning compared with conventional approaches, (ii) reduce artifacts introduced by pixel skipping compared with conventional approaches, (iii) generate sharper images than conventional approaches and/or (iv) generate smoother images than conventional approaches.

BRIEF DESCRIPTION OF THE DRAWINGS

These and other objects, features and advantages of the present invention will be apparent from the following detailed description and the appended claims and drawings in which:

FIG. 1 is a diagram of a conventional 3× vertical binning;

FIG. 2 is a diagram of a conventional 2× horizontal binning;

FIG. 3 is a diagram of a conventional 2× horizontal and 2× vertical binning;

FIG. 4 is a diagram of a conventional 2× horizontal skipping;

FIG. 19 is a diagram of symmetric 5 by 5 region of coefficients for a lowpass filter;

FIG. 21 is a diagram of a horizontal gradient mask; and

FIG. 22 is a diagram of a vertical gradient mask.

DETAILED DESCRIPTION OF THE PREFERRED EMBODIMENTS

Figure 5:
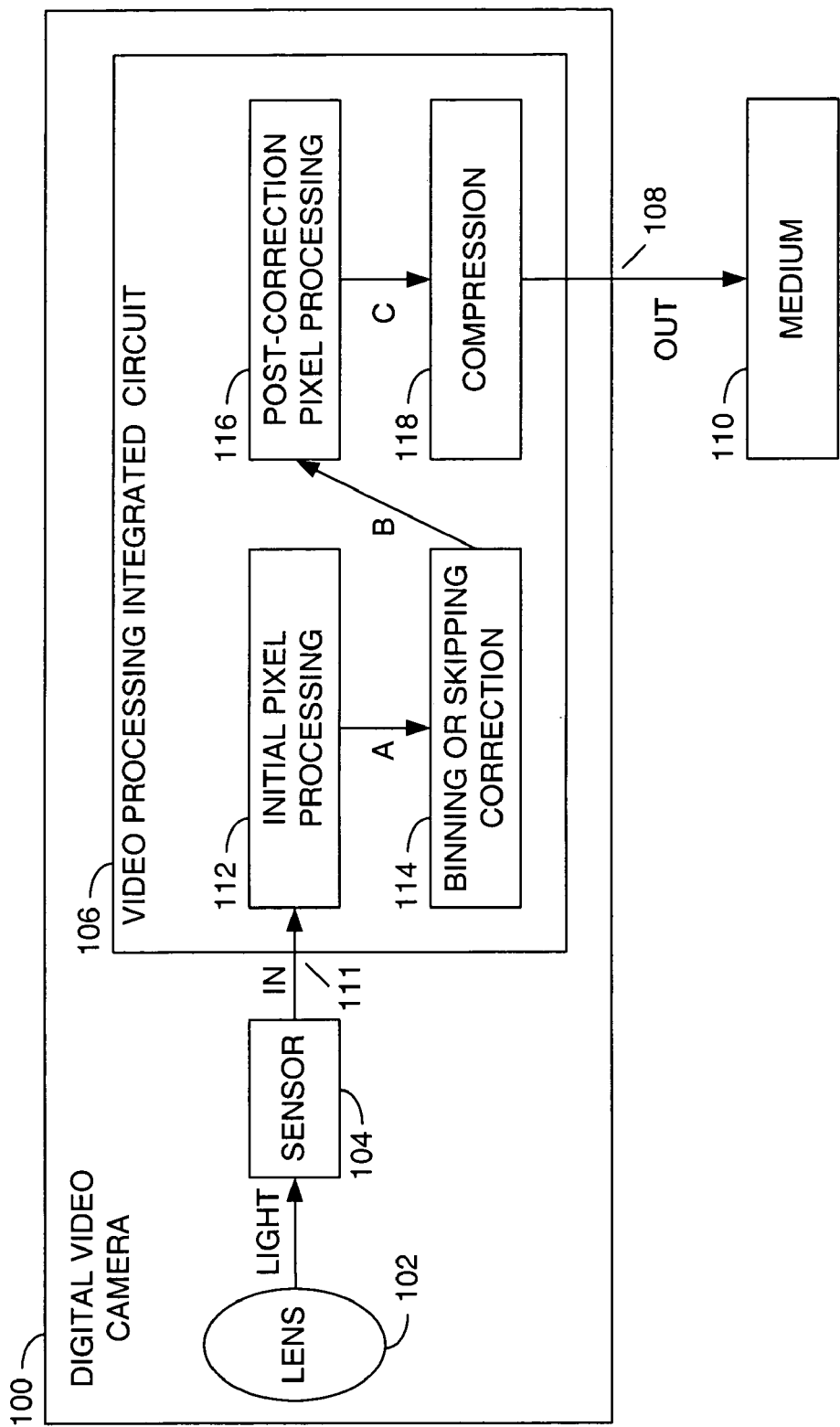
FIG. 5 is a block diagram of example implementation of a camera in accordance with a preferred embodiment of the present invention.

Referring to FIG. 5, a block diagram of example implementation of a camera 100 is shown in accordance with a preferred embodiment of the present invention. The camera 100 may be referred to as digital video camera. The digital video camera 100 generally comprises a lens 102, a sensor 104 and a circuit 106. An interface 108 may be provided in the digital video camera 100 to connect to a medium 110.

An optical signal (e.g., light) may be focused by the lens 102 onto the sensor 104. The sensor 104 generally produces Bayer pixels in a signal (e.g., IN) at an input 111 of the circuit 106. The pixels in the signal IN may be processed by the circuit 106 to generate a signal (e.g., OUT). The signal OUT may be transferred through the interface 108 to the medium 110 for storage, transmission and/or display.

An example implementation of the sensor 104 may be an MT9T0013-megapixel digital image sensor available from Micron Technology, Inc., Bosie, Id. Operations of the MT9T001 sensor are generally described in a document, "Micron, ½-inch, 3-megapixels CMOS Active-Pixel Digital Image Sensor", Preliminary Datasheet, MT9T001, September 2004, by Micron Technology Inc., hereby incorporated by reference in its entirety.

The signal IN may be a stream of digital values representing a frame (or picture) captured by the sensor 104. The digital values may have eight to ten bits of resolution. Each of the digital values may represent one element of the red element, blue element and two green elements of a Bayer set. Frame rates of the signal IN generally range from 15 frames per second to 60 frames per second. Other digitization level, rates and pixel arrangements may be implemented to meet the criteria of a particular application.

The signal OUT may be a video stream or a compressed video stream. MPEG-2, ITU-T Recommendation H.264|ISO/IEC 14496-10 Advanced Video Coding (AVC) or other compression standards may be performed by the video processing unit 106. Documentation for the MPEG-2 and H.264 standards are available from the International Organization for Standardization/International Electrotechnical Commission (ISO/IEC) MPEG and the Video Coding Expert Group (VCEG) of the International Telecommunications Union-Telecommunications Standardization Sector (ITU-T), Geneva, Switzerland.

The media 110 may be one or more of a transmission medium, a storage medium and/or a display medium. Where the medium 110 is carried within the digital video camera 100 and/or a long distance transmission medium (e.g., for a remote surveillance camera), the signal OUT may be a compressed video signal. Where the medium 110 is a display and/or a short cable (i.e., connect to a DVD player/recorder), the signal OUT may be an uncompressed video signal.

The circuit 106 may be referred to as a video processing unit. The video processing unit 106 generally comprises a circuit (or module) 112, a circuit (or module) 114, a circuit (or module) 116 and an optional circuit (or module) 118. The circuit 112 may generate a signal (e.g., A) in response to the signal IN. A signal (e.g., B) may be generated by the circuit 114 in response to the signal A. The circuit 116 may generate a signal (e.g., C) in response to the signal B. The circuit 118 may generate the signal OUT at the interface 108 in response to the signal C.

The circuit 112 may be referred to as an initial pixel processing circuit 112. The initial pixel processing circuit 112 may be operational to process the signal IN to present a signal (e.g., A). Processing of the signal IN may include, but is not limited to, digital gain for color corrections and digital offsets for color corrections.

The circuit 114 may be referred to as a binning or skipping correction circuit, or just a correction circuit for short. The correction circuit 114 may be operational to adjust the relative position of the Bayer pixels from the signal A to reduce and/or eliminate artifacts caused by binning or skipping (also referred to as pixel reduction) by the sensor 104. Binning and skipping correction is generally processing that improves a subjective quality of video presented from the sensor 104 that has performed binning and/or skipping. The binning and skipping correction may be inactive when the sensor 104 is neither binning nor skipping pixels. In one embodiment, the initial pixel processing circuit 112 and the correction circuit 114 may be swapped. As such, the correction circuit 114 may operate directly on the Bayer pixels in the signal IN and the initial pixel processing circuit 112 may operate on the corrected Bayer pixels.

The circuit 116 may be referred to as a post-correction pixel processing circuit. The post-correction pixel processing circuit 116 may be operational to adjust the pictures in the signal B. The adjustments may include, but are not limited to, down converting (e.g., decimation), up converting (e.g., interpolation), filtering, image sharpening and/or image smoothing. Other post-correction functions may be implemented to meet the criteria of a particular application.

The circuit 118 may be referred to as a compression circuit. The compression circuit 118 may be an optional function of the digital video camera 100. Where included, the compression circuit 118 is generally operational to compress the signal C to generate the signal OUT as a compressed video bitstream. Where the circuit 118 is not included, the signal OUT may be a conventional uncompressed video bitstream.

An effect of binning or skipping is that the relative position of pixels after binning or skipping is generally not uniform. The non-uniformity may be seen by visualizing a position of a particular post-binning or post-skipping pixel as an average position of the pixels that were used to form the particular pixel. FIGS. 6-9 show the positions of pixels after the various binning and skipping operations of FIGS. 1-4. As illustrated, the rows and columns of the post-binned or post-skipped image may not be evenly spaced.

Figure 6:
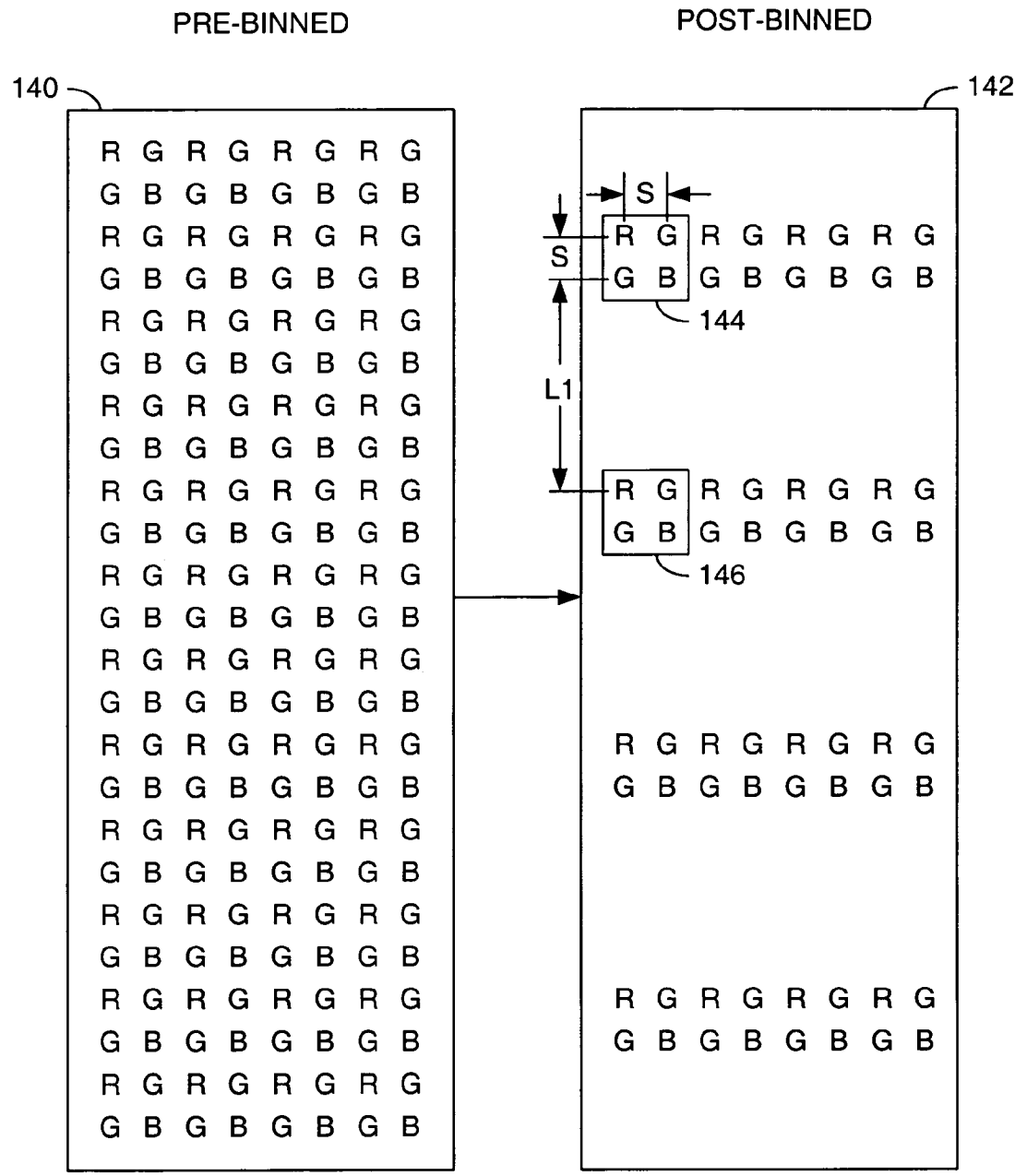
FIG. 6 is a diagram of a 3× vertical binning.

Referring to FIG. 6, a diagram of a 3× vertical binning of an initial set 140 of pre-binned pixels to a modified set 142 of post-binned pixels is shown. A small spacing (e.g., S) generally exists between rows of post-binned pixels within a Bayer set (e.g., 144). A large spacing (e.g., L1>S) generally exists between adjacent rows of the post-binned Bayer sets (e.g., Bayer set 144 to Bayer set 146).

Figure 7:
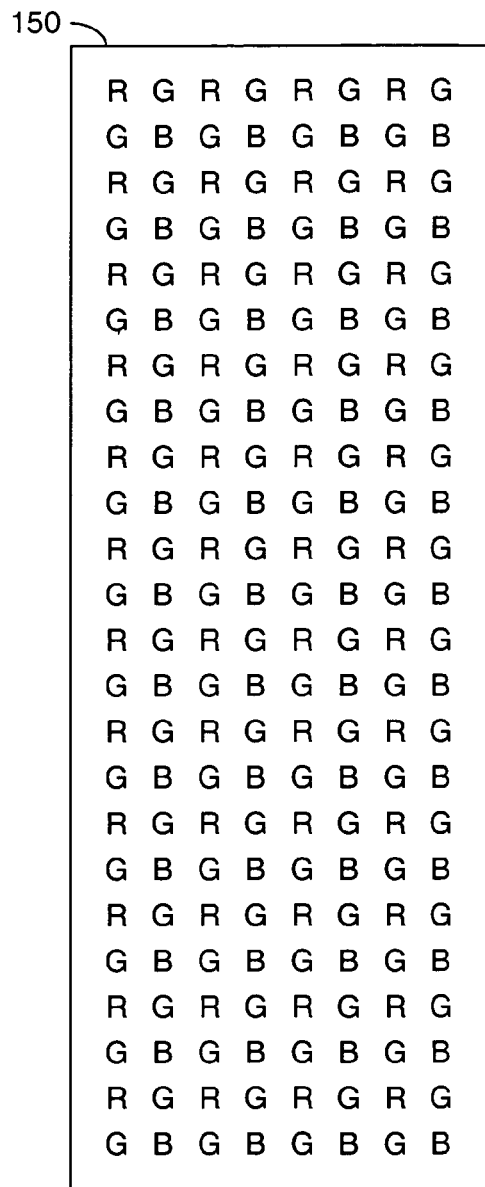
FIG. 7 is a diagram of a 2× horizontal binning.
Figure 7:
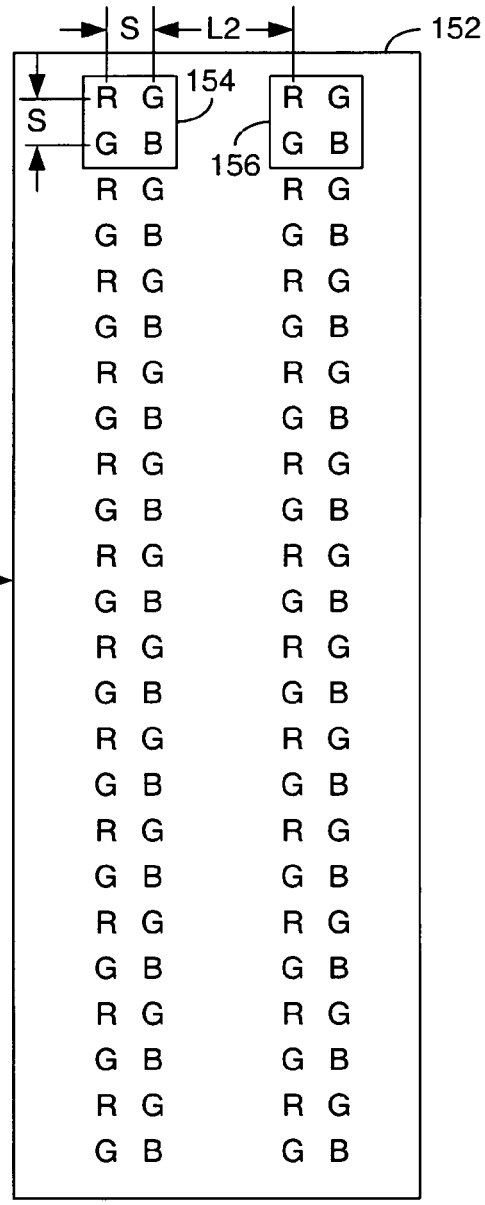

Referring to FIG. 7, a diagram of a 2× horizontal binning of an initial set 150 of pre-binned pixels to a modified set 152 of post-binned pixels is shown. The small spacing S may exist between columns of post-binned pixels within a Bayer set (e.g., 154). A large spacing (e.g., L2) generally exists between adjacent columns of the post-binned Bayer sets (e.g., Bayer set 154 to Bayer set 156).

Figure 8:
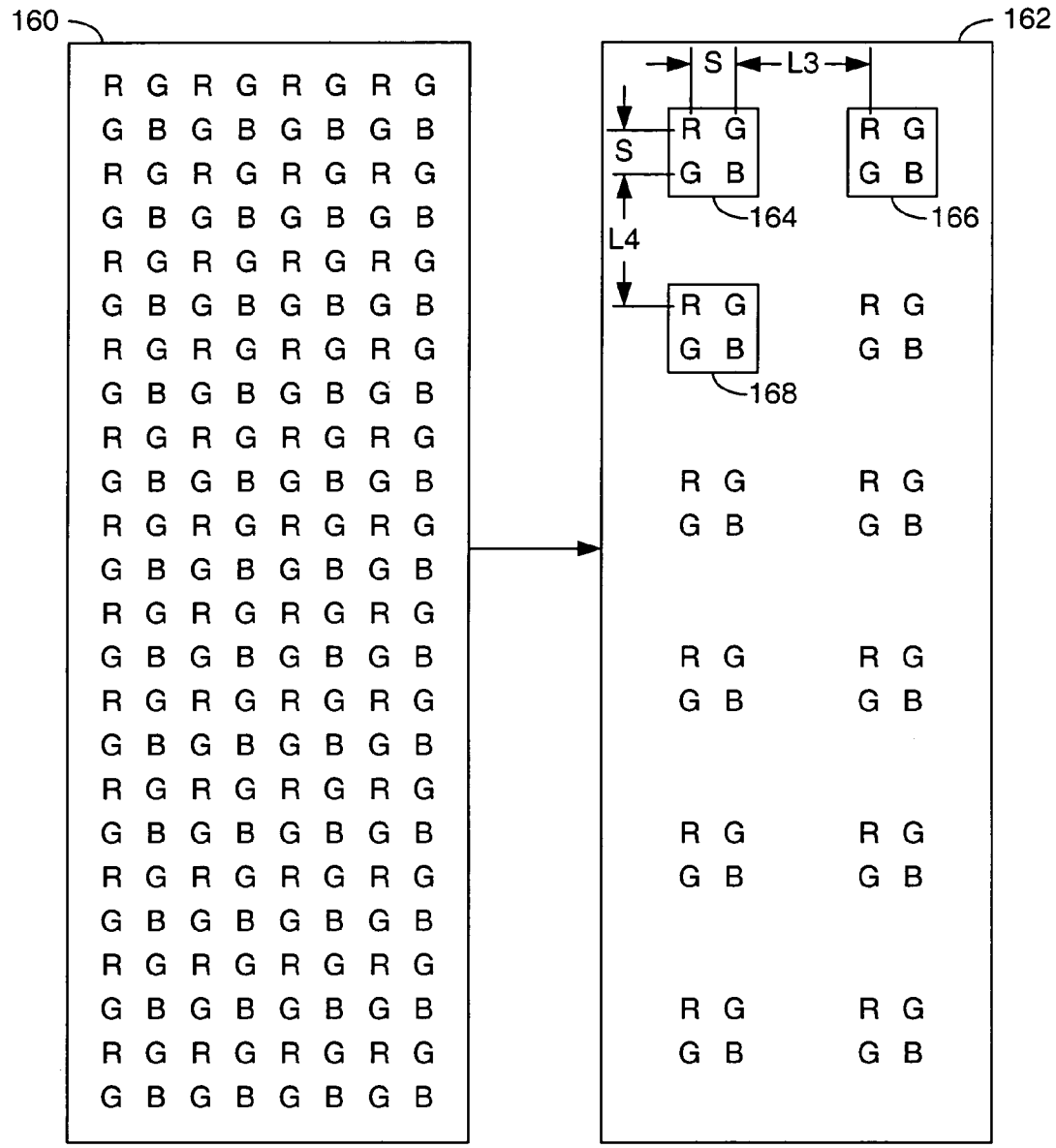
FIG. 8 is a diagram of a 2× horizontal and 2× vertical binning.

Referring to FIG. 8, a diagram of a 2× horizontal and 2× vertical binning of an initial set 160 of pre-binned pixels to a modified set 162 of post-binned pixels is shown. The small spacing S generally exists between rows and between columns of post-binned pixels within a Bayer set (e.g., 164). A large horizontal spacing (e.g., L3) generally exists between adjacent columns of the post-binned Bayer sets (e.g., Bayer set 164 to Bayer set 166). A large vertical spacing (e.g., L4) may exist between adjacent rows of the post-binned Bayer sets (e.g., Bayer set 166 to Bayer set 168).

Figure 9:
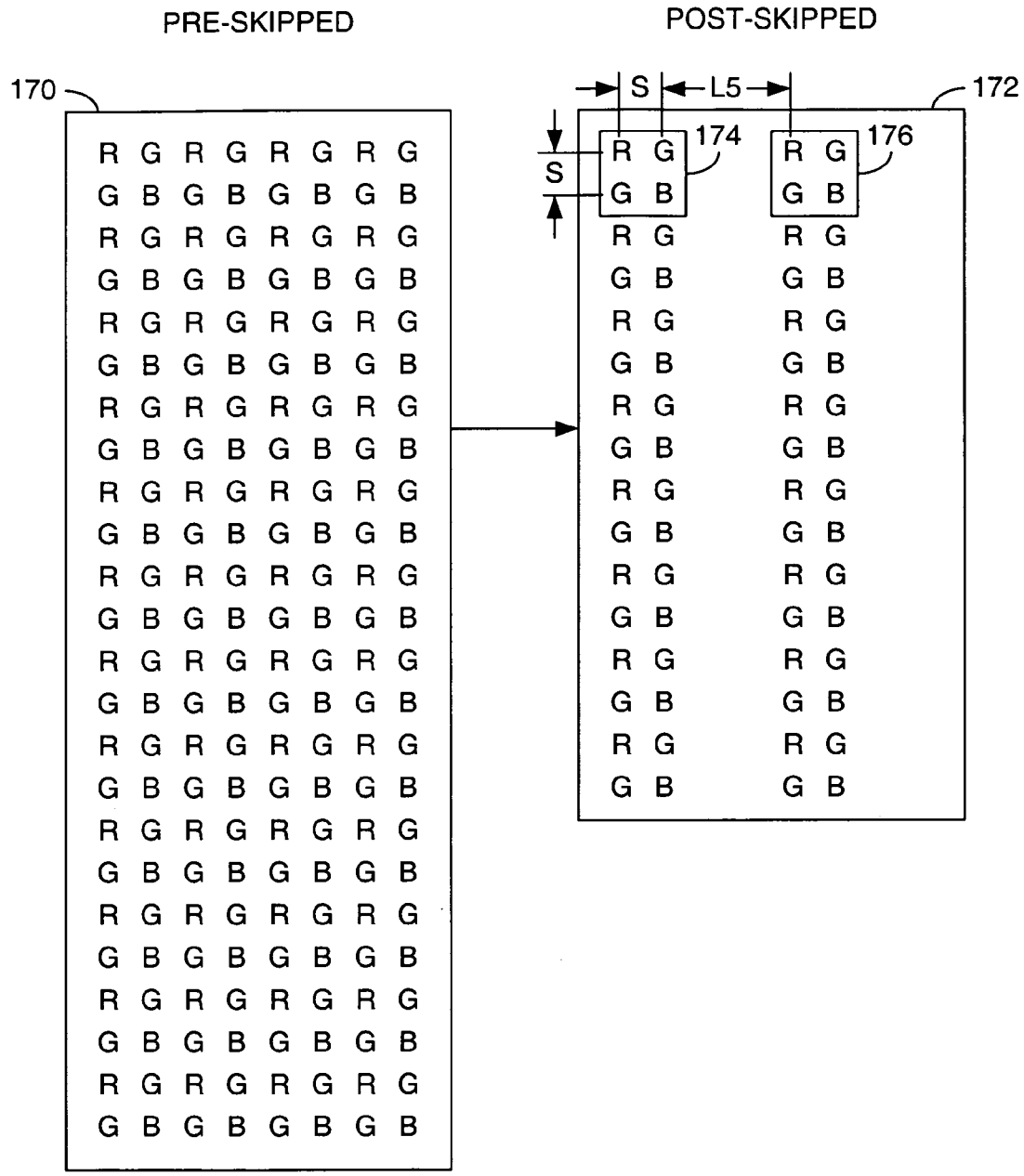
FIG. 9 is a diagram of a 2× horizontal skipping.

Referring to FIG. 9, a diagram of a 2× horizontal skipping of an initial set 170 of pre-skipped pixels to a modified set 172 of post-skipped pixels is shown. The small spacing S may exist between columns of post-skipped pixels within a Bayer set (e.g., 174). A large spacing (e.g., L5) generally exists between adjacent columns of post-skipped Bayer sets (e.g., Bayer set 174 to Bayer set 176).

Generally, horizontal binning or skipping operation by a factor of H places a Bayer set (2G pixels, an R pixel and a B pixel) with a same distance to each other as before binning or skipping (e.g., a pre-binning or a pre-skipping column.) However, an adjacent post-binning or post-skipping Bayer set may start 2H−1 columns after the end of the first set.

Similarly, vertical binning or skipping operation by a factor of V generally places a Bayer set with a same distance to each other as before binning or skipping (e.g., a pre-binning or a pre-skipping row.) However, an adjacent post-binning or post-skipping Bayer set may start 2V−1 rows after the end of the first set. Note that the relative spacing of pixels after binning is generally the same as the relative spacing after skipping. A difference between binning and skipping is that the absolute positions of the resulting pixels may be different. For example, the position of the output pixels relative to the box in FIG. 7 (2× horizontal binning) differs from the position of the output pixels relative to the box in FIG. 9 (2× horizontal skipping). The relative position of the output pixels to themselves is generally the same in FIGS. 7 and 9.

An aspect of the present invention generally involves processing post-binned or post-skipped pixels to place the pixels in the correct relative positions (e.g., the pixels equally spaced from each other). Conventional camera processors process post-binning or post-skipping Bayer pixels in the same way that un-binned and un-skipped pixels are processed. Not accounting for the binning or skipping leads to poor image quality, such as jagged edges and other artifacts.

In a first embodiment, the RGB Bayer pixel positions may be corrected, as is illustrated in FIGS. 10-13 for the binning and skipping cases of FIGS. 1-4. In FIGS. 10-13, new pixels (e.g., lowercase "r", "b" and "g") may be generated from the post-binned or post-skipped pixels (e.g., uppercase "R", "B" and "G"). The new pixels generally represent post-binning or post-skipping position-corrected pixels, referred to corrected pixels for short. The corrected pixels are generally evenly spaced from one another in both a vertical and a horizontal direction. The even spacing may or may not be the same spacing in each direction. The corrected pixels may be computed from the post-binned or post-skipped (modified) pixels by interpolation. The corrected pixels alone may be presented by the correction circuit 114 in the signal B.

After binning or skipping, the modified pixels within each of the Bayer sets generally maintain an initial spacing between each other, but the Bayer sets themselves may be relatively far away from each other. Making the corrected pixels uniformly spaced generally allows for some flexibility in the absolute positions achieved for the post-corrected pixels. In one embodiment, (as shown in FIGS. 9-12) four corrected pixels (r, b, and 2g) may be generated outside each clustered (pre-corrected or modified) Bayer set.

Figure 10:
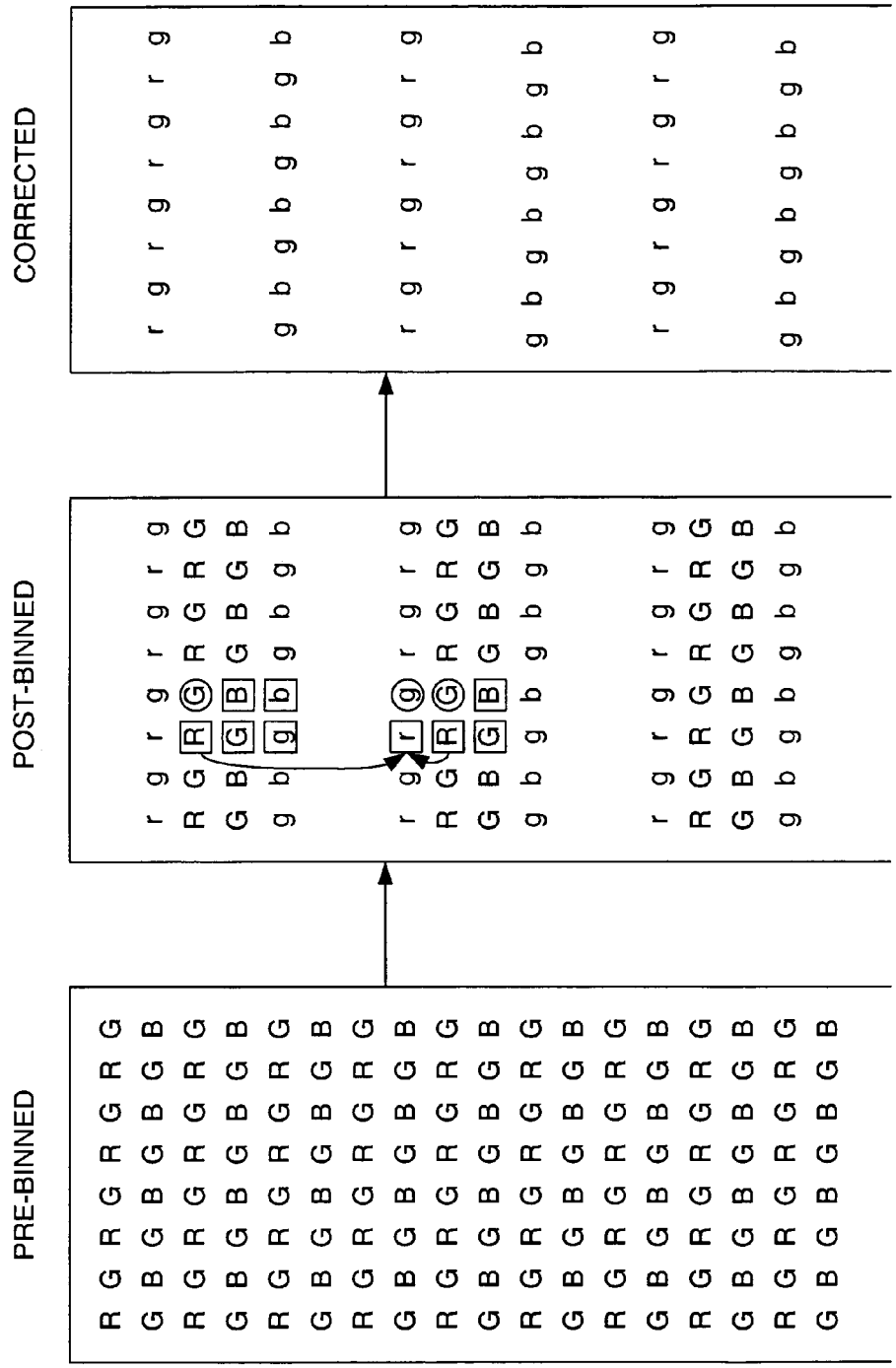
FIG. 10 is a diagram of corrected pixel positions for the 3× vertical binning.

Referring to FIG. 10, when vertical binning or skipping is used, (i) two corrected pixels of like color may be generated above the two top-most modified pixels in each of the Bayer sets and (ii) two corrected pixels of like color may be generated below the two bottom-most modified pixels in each of the Bayer sets. As drawn with a Bayer pattern of "R G" on the top and "G B" on the bottom, corrected pixels "r g" may be on top of the clustered set and corrected pixels "g b" may be bellow the clustered set. The corrected pixels alone may be presented from the correction circuit 114 in the signal B. The corrected pixels within the signal B may form corrected pictures (images).

Figure 11:
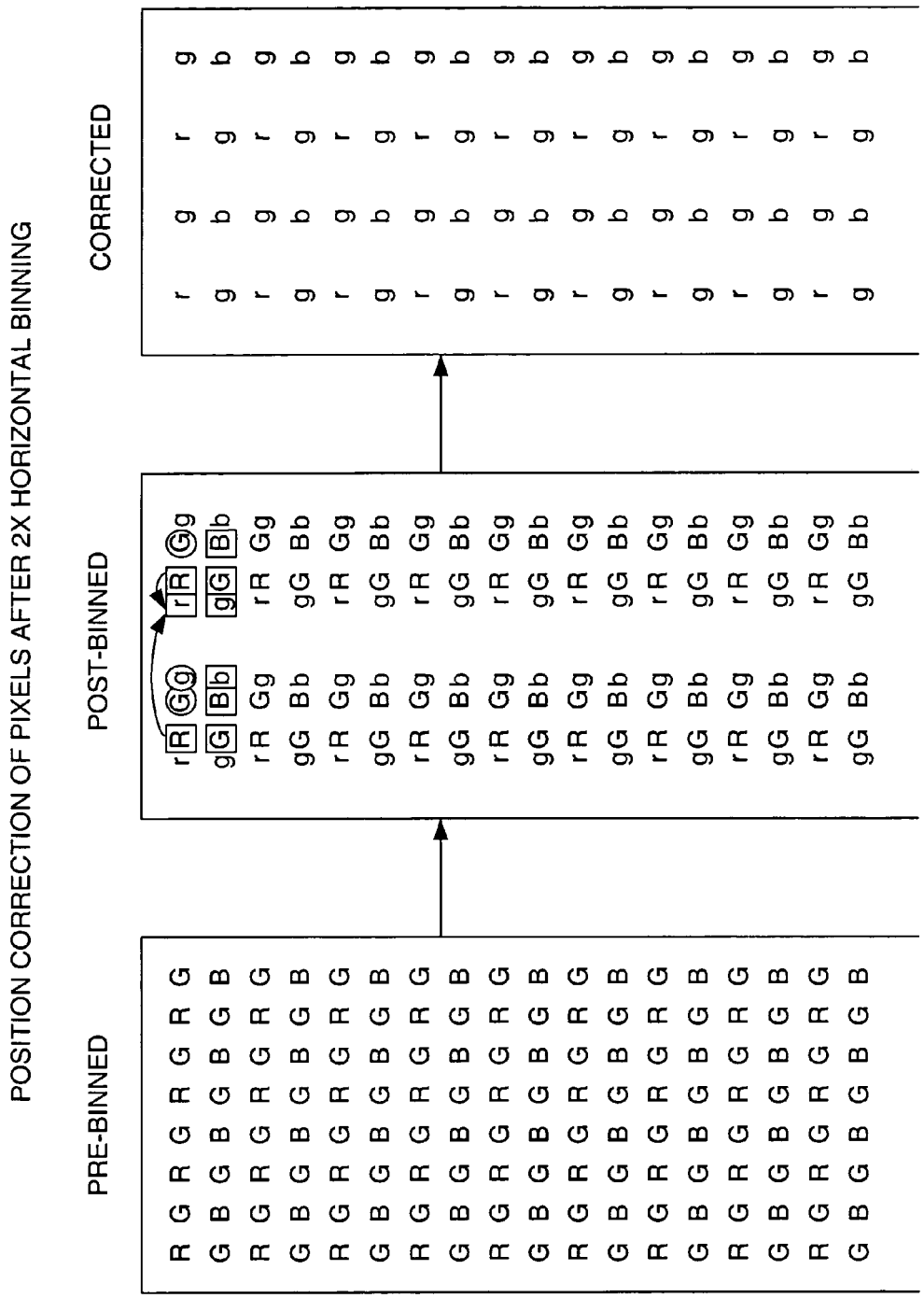
FIG. 11 is a diagram of corrected pixel positions for the 2× horizontal binning.
Figure 13:
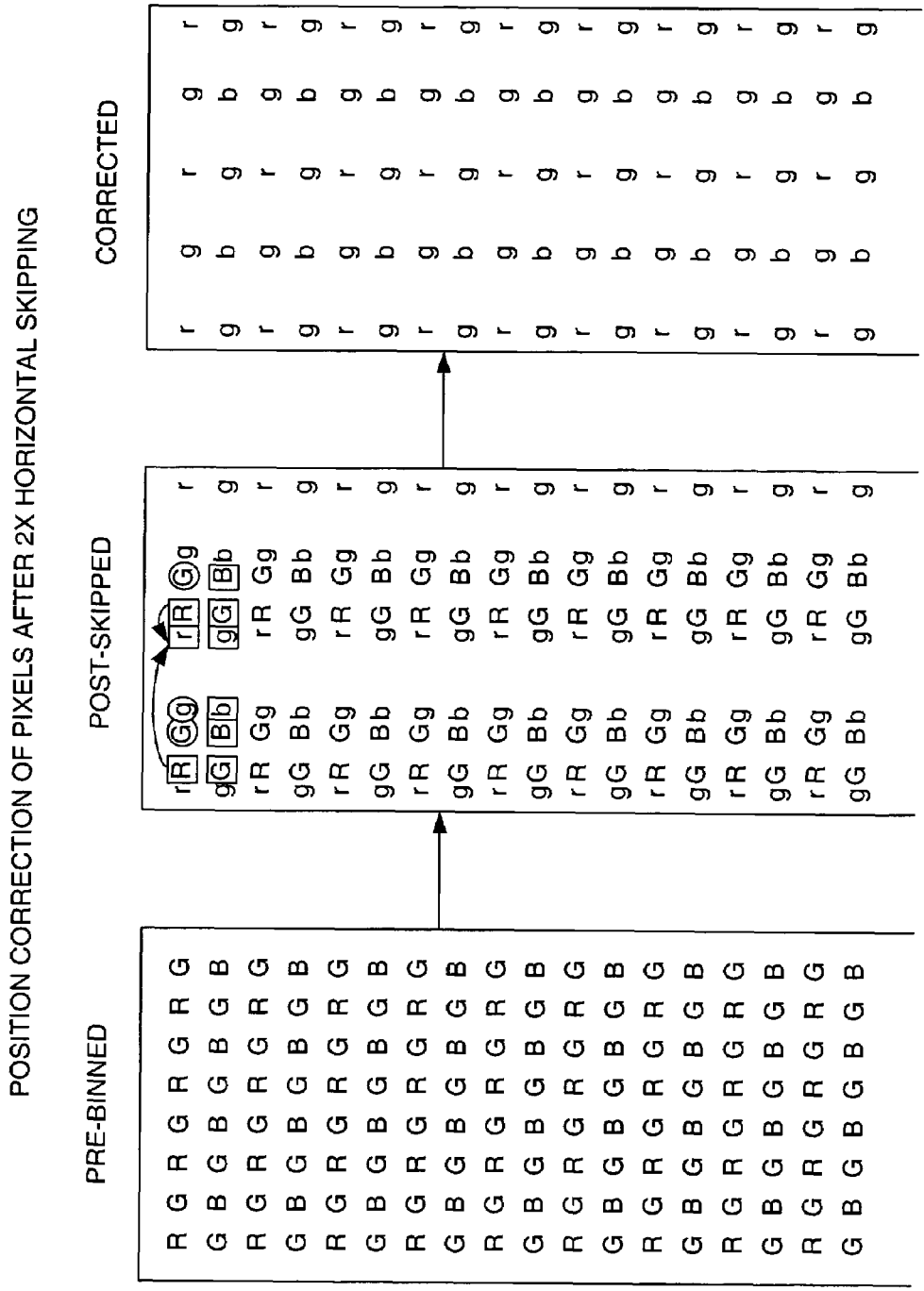
FIG. 13 is a diagram of corrected pixel positions for the 3× horizontal skipping.

Referring to FIGS. 11 and 13, when horizontal binning or skipping is used, (i) two corrected pixels of like color may be generated left of the two left-most modified pixels in each of the Bayer sets and (ii) two corrected pixels of like color may be generated right of the two right-most modified pixels in each of the Bayer sets. As drawn with a Bayer pattern of "R G" on the top and "G B" on the bottom, corrected pixels "r g" may be to the left of the clustered set and corrected pixels "g b" may be to the right of the clustered set.

Figure 12:
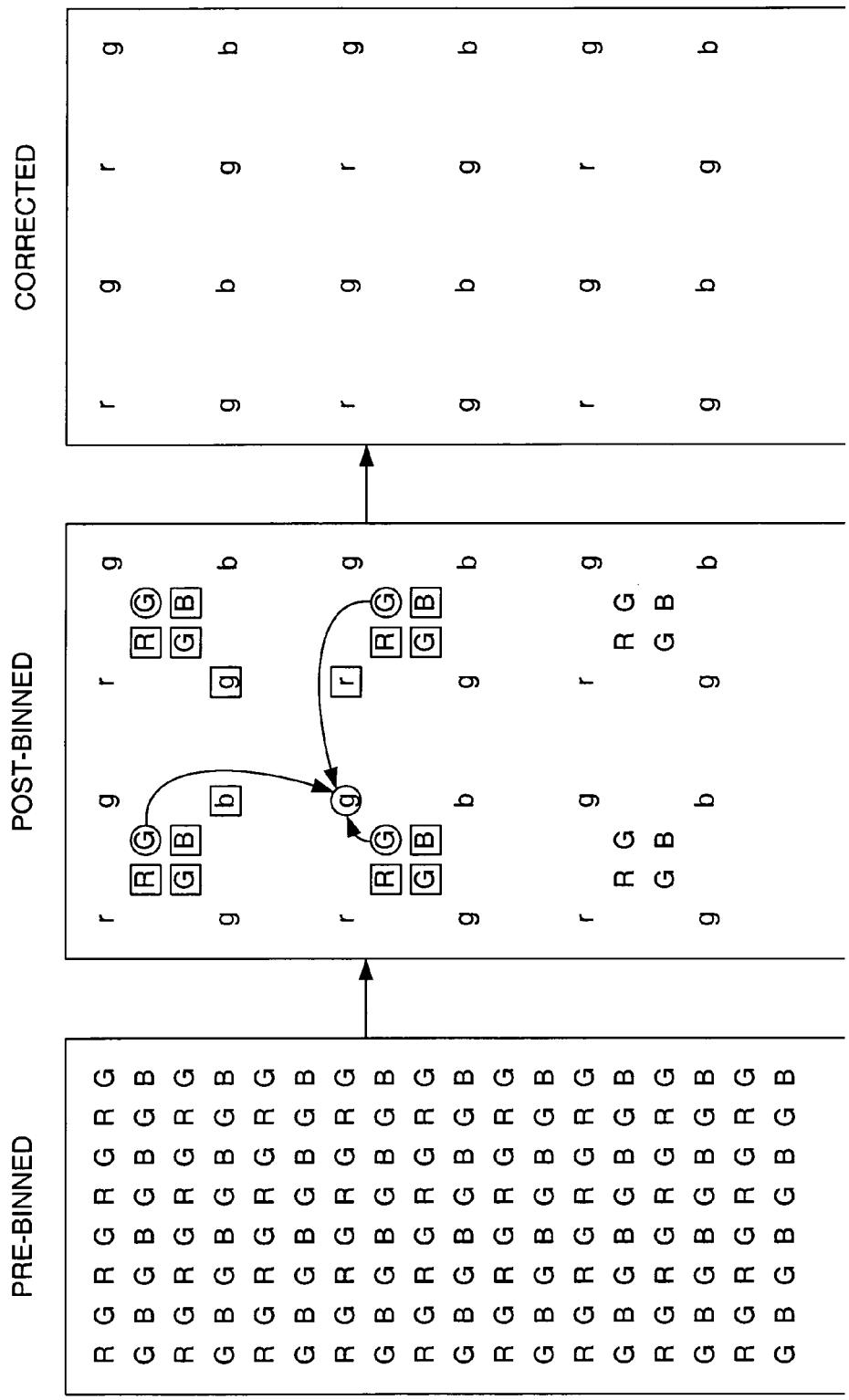
FIG. 12 is a diagram of corrected pixel positions for the 2× horizontal and vertical binning.

Referring to FIG. 12, when both vertical and horizontal binning or skipping are used, (i) a corrected pixel of the same color as the top-left modified pixel of the clustered set may be generated above and to the left of the clustered set, (ii) a corrected pixel of the same color as the top-right modified pixel of the clustered set may be generated above and to the right of the clustered set, (iii) a corrected pixel of the same color as the bottom-left modified pixel of the clustered set may be generated below and to the left of the clustered set and (iv) a corrected pixel of the same color as the bottom-right modified pixel of the clustered set may be generated below and to the right of the clustered set. As drawn with a Bayer pattern of "R G" on the top and "G B" on the bottom, a corrected pixel "r" may be above and to the left of the clustered set, a corrected pixel "g" may be above and to the right of the clustered set, another corrected pixel "g" may be below and to the left of the clustered set and a corrected pixel "b" may be below and to the right of the clustered set. Generally, a distance from the pre-corrected pixels within the cluster set to the corrected like-colored pixel just outside the cluster set may have a same distance for all pixels.

Figure 14:
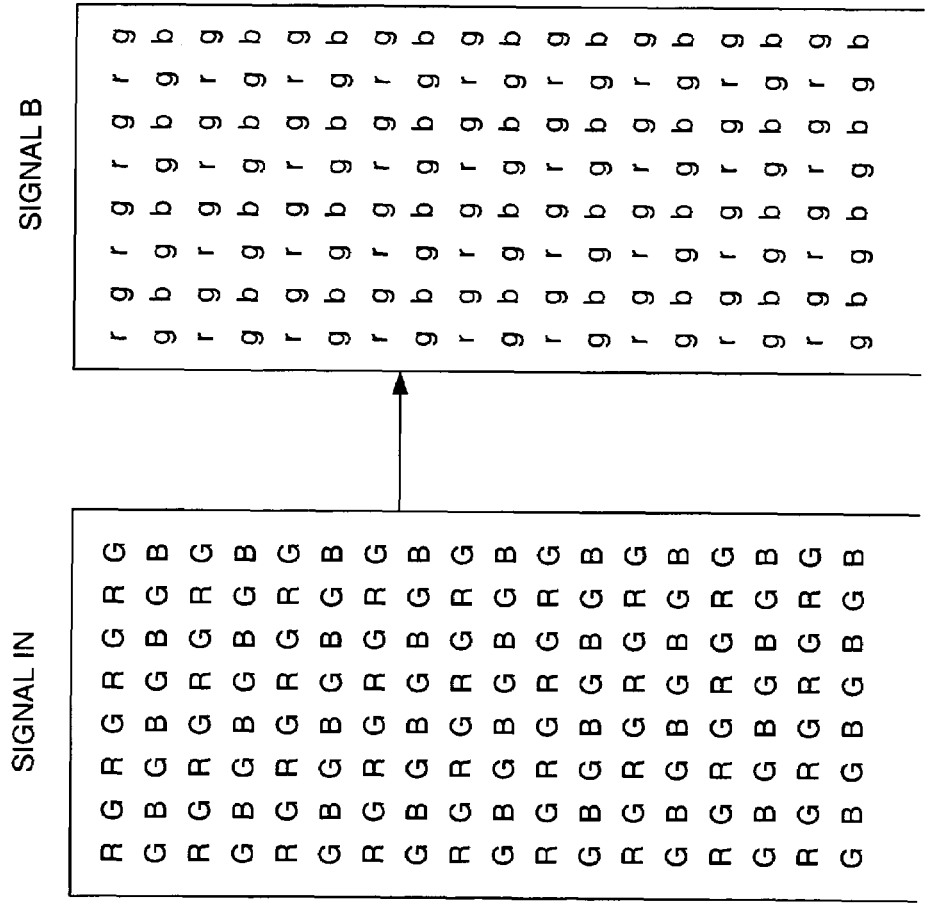
FIG. 14 is a diagram of corrected pixel positions for no binning or skipping.

Referring to FIG. 14, when neither binning nor skipping is used, a position of the modified pixels in each cluster set may be maintained. As such, generation of the corrected pixels may be bypassed. The correction circuit 114 may pass the pixels in the signal A along in the signal B thus maintaining the relative spatial position of the pixels as read from the sensor 104.

Figure 15:
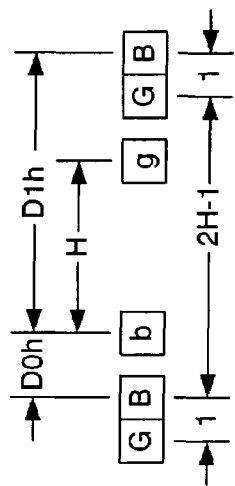
FIG. 15 is a diagram of various inter-pixel distances for an example H:1 horizontal binning or skipping case.

Referring to FIG. 15, a diagram of various inter-pixel distances for an example H:1 horizontal binning or skipping case is shown. A value H is the binning or skipping factor, and distances D0h and D1h may be distances between a corrected pixel and two closest same-color pre-correction neighboring pixels. The distances are generally shown relative to a unit distance (e.g., 1) between the original (pre-binned or pre-skipped) pixels, which is also the distance between pixels within a cluster after binning or skipping. In the particular example shown, H=4 in FIG. 15. The placements of the corrected pixels may be calculated per equations 1 through 2 as follows:

$$D0h + D1h = 2H \qquad \text{Eq. (1)}$$

$$2D0h + H = 2H - 1 \qquad \text{Eq. (2)}$$

Equations 1 and 2 may be rearranged as equations 3 and 4 as follows:

$$D0h=(H-1)/2 \qquad \text{Eq. (3)}$$

$$D1h=(3H+1)/2 \qquad \text{Eq. (4)}$$

For example, when H=2 (2:1 horizontal binning), D0h=½. Since like-colored pixels are generally 2H=4 units from one another in the corrected image, the total change in position in units of like-colored pixel distances in the corrected image may be ½÷4=⅛. Similarly, the distances from pre-corrected pixels to post-corrected pixels when vertical binning or skipping is used may be calculated by equations 5 and 6 as follows:

$$D0v=(V-1)/2 \qquad \text{Eq. (5)}$$

$$D1v=(3V+1)/2 \qquad \text{Eq. (6)}$$

Note that an absolute spacing of pixels in the present embodiment generally minimizes a maximum distance that any corrected pixel is to a like-colored pre-corrected pixel. For example, FIG. 11 generally shows:

Each corrected red pixel may be ⅛th of an inter-pixel-difference to the left of a corresponding pre-corrected red pixel.

Each corrected green pixel on the same line as a red pixel may be ⅛th of an inter-pixel-difference to the right of a corresponding pre-corrected green pixel.

Each corrected blue pixel may be ⅛th of an inter-pixel-difference to the right of a corresponding pre-corrected blue pixel.

Each corrected green pixel on the same line as blue pixel may be ⅛th of an inter-pixel-difference to the left of a corresponding pre-corrected green pixel.

Figure 16:
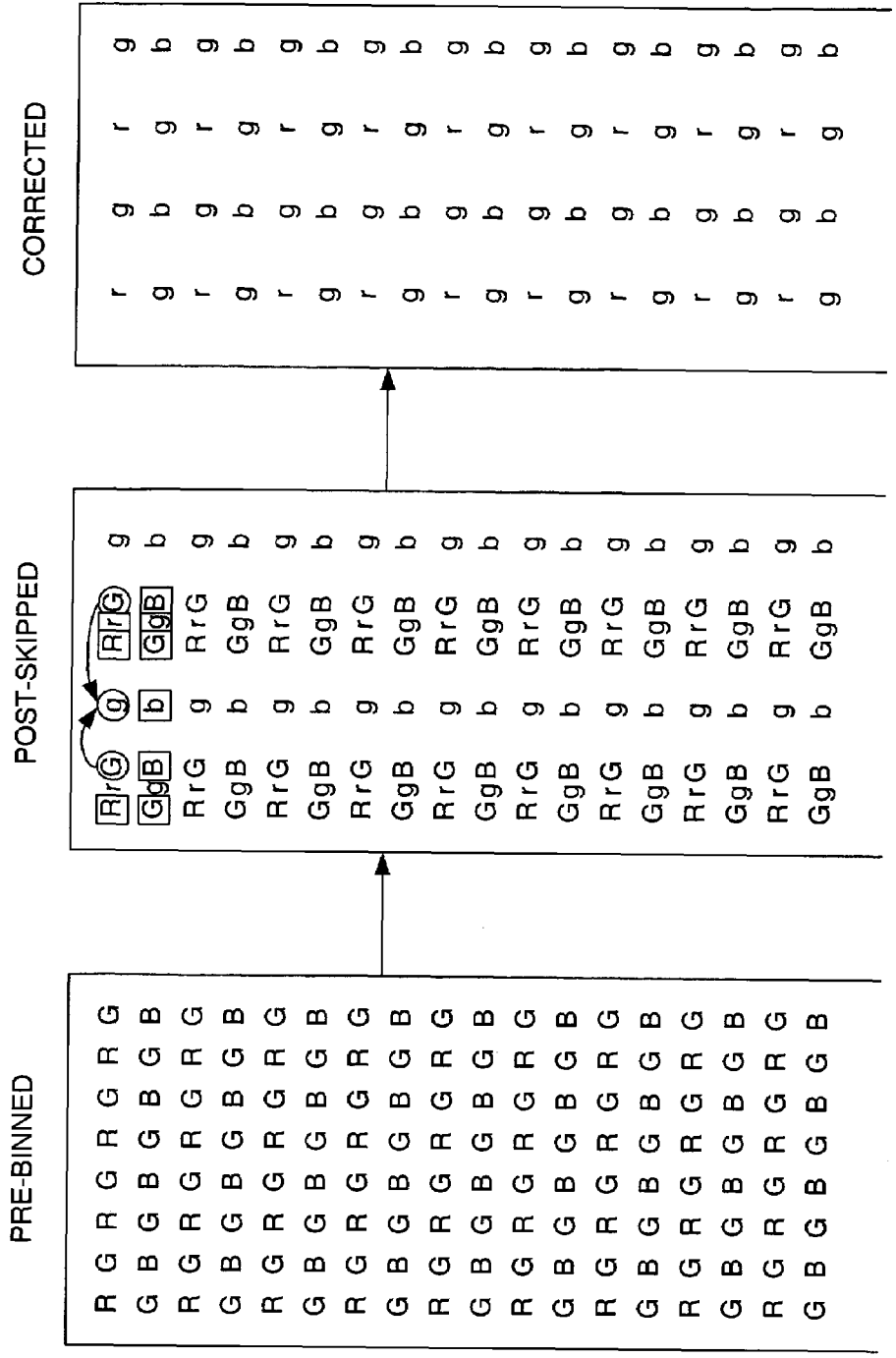
FIG. 16 is a diagram of an example correction where the corrected pixels are to the right as compared with that of FIG. 13.

Referring to FIG. 16, a diagram of an example correction is shown where the corrected pixels are ¼th of a pixel to the right as compared with that of FIG. 13. The spacing between corrected pixels is generally uniform and both green pixels on blue/green pixel lines and red pixels may be ⅛th of a pixel distance from pre-corrected like-colored pixels. However, green pixels on red lines and blue pixels may be ⅜th a pixel distance from the nearest like-colored pixels. In comparison, the symmetric approach of FIG. 13 tends to give better subjective quality than the shifted approach of FIG. 16.

Generation of the corrected pixels may be performed using interpolation. The interpolation may comprise linear or bilinear interpolation of like-colored samples, with green samples on red rows used to compute green samples on red rows and green samples on blue rows used to compute green samples on blue rows. Distinguishing the two green pixels is generally illustrated in FIGS. 10-13 with boxed uppercase B pixels, boxed uppercase R pixels, boxed uppercase G pixels and circled uppercase G pixels may be used to compute, respectively, boxed lowercase b pixels, boxed lowercase r pixels, boxed lowercase g pixels and circled lowercase g pixels Horizontal linear interpolation is generally performed taking a weighted average of the like-colored pixel to the left and the like-colored pixel to the right of the interpolated (corrected) pixel. Weighting of contributions from each like-colored pre-corrected pixel to the corrected pixel may be (i) inversely proportional to the distance between the pre-corrected pixels and the corrected pixel distances and (ii) the two weights may be summed (normalized) to one. Based on the above formulae 3 and 4 for distances, the weights may be expressed by equations 7 and 8 as follows:

$$\text{Weight for near like-colored pixel}=(3H+1)/4H \qquad \text{Eq. (7)}$$

$$\text{Weight for far like-colored pixel}=(H-1)/4H \qquad \text{Eq. (8)}$$

Referring again to FIG. 15, the corrected blue pixel value would be (3H+1)/4H times the left-most pre-corrected blue pixel plus (H−1)/4H times the right-most pre-corrected blue pixel value. The corrected green pixel value would be (3H+1)/4H times the right-most pre-corrected green pixel and (H−1)/4H times the left-most pre-corrected green pixel value. For an example, where H=3, the left and right weights may be ⅞th and ⅛th, respectively.

Vertical linear interpolation is generally performed taking a weighted average of the like-colored pixels above and below the interpolated (corrected) pixel. Weighting may be inversely proportional to the distance between the pre-corrected pixel and the corrected pixel, normalized to one. Based on the above formulae 5 and 6 for distances, the weights may be expressed by equations 9 and 10 as follows:

$$\text{Weight for near like-colored pixel}=(3V+1)/4V \qquad \text{Eq. (9)}$$

$$\text{Weight for far like-colored pixel}=(V-1)/4V \qquad \text{Eq. (10)}$$

Combined horizontal and vertical interpolation may be accomplished either by first interpolating horizontally and then vertically, or else first interpolating vertically and then horizontally. Combined horizontal and vertical interpolation may be referred to as bilinear interpolation.

Position-correction has been generally described above by "separable" linear interpolation, (i) horizontal linear interpolation if horizontal skipping or binning is used, (ii) vertical linear interpolation if vertical skipping or binning is used and (iv) either (a) vertical followed by horizontal or (b) horizontal followed by vertical linear interpolation if vertical and horizontal skipping or binning is used. Other possible methods for position correction include, but are not limited to, different absolute placement of final pixels from the above description, use of more than two pixels when interpolating in one direction, use of nonlinear interpolation (e.g., methods other than weighted averages) and use of non-separable interpolation (e.g., directly computing interpolated pixels from a two-dimensional neighborhood without separate horizontal and vertical processing).

The correction circuit 114 may be located at different places along a path from the input 111 to the output 108 in different embodiments. Furthermore, a conversion of the Bayer pixels to full RGB (demosaic) may be performed before the position correction operation. In addition, the Bayer pixels may be converted to full RGB, converted to YUV, and then the position correction may be applied to either (i) all of the Y, U and V components or (i) just the Y component.

Position correction may not remove all binning artifacts and/or may introduce some other artifacts. For example, bilinear interpolation generally tends to make an image softer. A further aspect of the present invention may be to add processing (e.g., the post-correction processing circuit 116) after position correction when binning or skipping is used in the sensor 104.

In a first embodiment, (i) post-correction sharpening is generally used when binning or skipping is used and (ii) post-correction sharpening may not be use when binning or skipping is not used. In a second embodiment, an amount of sharpening used may depend on whether or not binning or skipping is used as well as possibly other factors. The first embodiment is generally a degenerate case of the second. The second case may allow for a variably controllable amount of sharpening, depending on whether binning or skipping is used and possibly other factors, such as (i) the characteristic of an anti-alias filter used in the digital video camera 100 and (ii) estimated noise levels based on the particular capture settings being used (e.g., analog gain, aperture size, shutter speed, etc.).

Figures 17, 18:
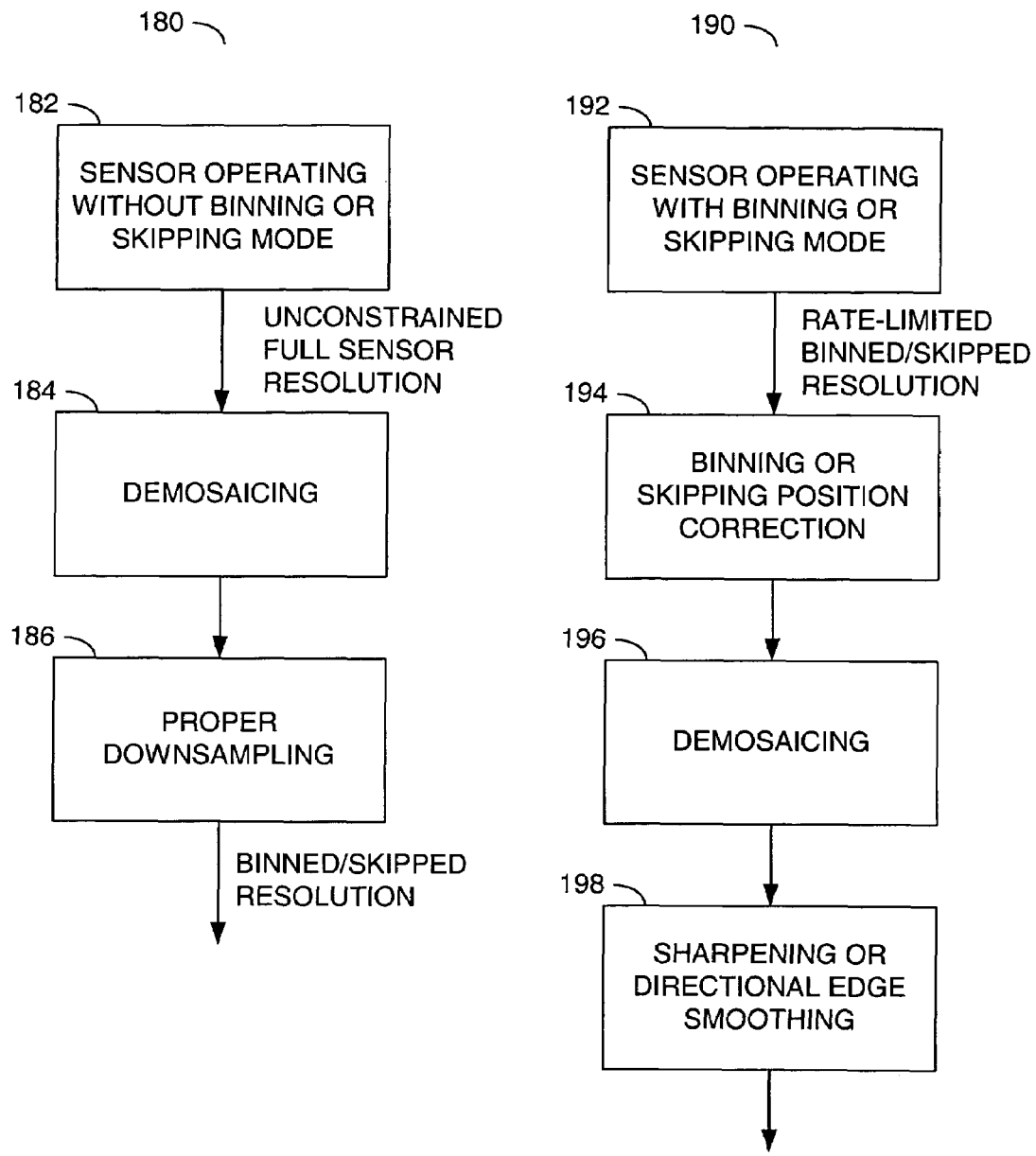
FIG. 17 is a flow diagram of a method for sharpening without binning or skipping.
FIG. 18 is a flow diagram of a method for sharpening with binning or skipping.

A goal of sharpening may be to restore the image softened by position correction (among other processing steps that may also introduce softening) to become sharper and closer to the ideal hypothetical "upper quality bound" case, as shown by a flow diagram of an example method 180 in FIG. 17. The method 180 generally comprises a step (or block) 182, a step (or block) 184 and a step (or block) 186. The upper quality bound case is a hypothetical situation obtaining a highest resolution image from the sensor 104 without any sensor output rate constraints, performing image conversion at the full resolution without binning/skipping and then properly downsampling to a resolution similar to the post-binning/skipping resolution.

In the step 182, the sensor may be operating without binning or skipping (and may be using framing). The post-correction processor circuit 116 may demosaic the pixels in the step 184. Downsampling may be performed by the post-correction processor circuit 116 in the step 186.

Referring to FIG. 18, a flow diagram of an example method 190 for a practical sensor output rate constrained case is shown. Binning/skipping may be employed in the method 190 to meet the output rate constraint. As such, a combination of (i) position correction processing used before demosaicing and (ii) sharpening used after demosaicing may attempt to achieve a reconstruction that approaches the quality of the situation of FIG. 17.

The method 190 generally comprises a step (or block) 192, a step (or block) 194, a step (or block) 196 and a step (or block) 198. In the step 192, the sensor 104 may be operating in a binning mode or a skipping mode. Binning or skipping position correction transformations may be performed by the correction circuit 114 in the step 194. Demosaicing may be achieved in the step 196 by the post-correction pixel processing circuit 116. In the step 198, image sharpening or directional smoothing along edges may be performed by the post-correction pixel processing circuit 116.

Sharpening may be performed on different components of the images. Sharpening may be applied to a full RGB image on each of the R, G, and B components separately. In another implementation, the full RGB image may be first converted to YUV and then only the Y component may be sharpened. Sharpening tends to be much more useful for the luminance component because the chrominance components tend to have relatively much lower resolution compared with the luminance for a vast predominance of natural scenes.

An example of a very basic sharpening method is commonly called a sharp-unsharp masking. The sharp-unsharp masking method generally involves first obtaining a more-blurred version of the image with the use of a low pass filter. Afterwards, a certain amount of the more-blurred image may be subtracted from the original image.

The sharp-unsharp masking may be implemented as described below. In a first pass, a lowpass version of an image (e.g., Y_lowpass) may be generated by passing the Y component image through a lowpass filter. The lowpass filter may have, for example, a symmetric 5 by 5 region of support and therefore may be defined by six unique coefficients shown in FIG. 19.

A second pass may apply the actual sharpening as expressed by equation 11 as follows:

$$Y\_sharpened = Y + Diff\_sharpening \qquad \text{Eq. (11)}$$

Where Diff_sharpening=alpha×(Y−Y_lowpass) and alpha may control the amount of sharpening. In a basic sharp-unsharp method, alpha may be a fixed value for all pixels of the image.

An enhancement to the basic sharp-unsharp masking generally involves adaptively modifying the value of alpha. The following generally describes adaptively varying the alpha value according to discrimination of edge versus flat regions of an image.

Figure 20:
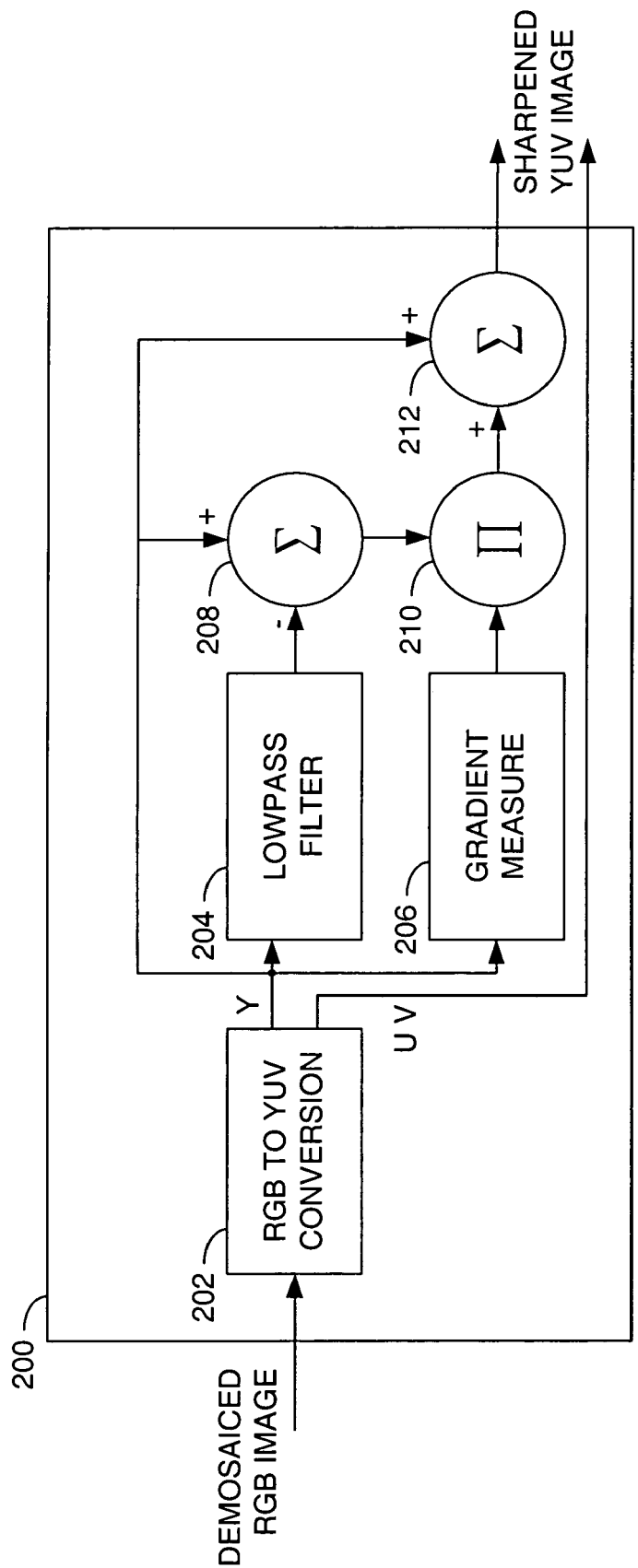
FIG. 20 is a flow diagram of an example method for sharpening, including an adaptation of the alpha value.

Referring to FIG. 20, a flow diagram of an example method 200 for sharpening, including an adaptation of the alpha value, is shown. The method 200 generally comprises a step (or block) 202, a step (or block) 204, a step (or block) 206, a step (or block) 208, a step (or block) 210 and a step (or block) 212. The method 200 may receive a demosaiced RGB image as an input and present a sharpened YUV image as an output.

Noise that is present in an image tends to become boosted using basic sharpening methods. Increasing an amount of sharpening on edge regions of an image and decreasing an amount of sharpening on flat regions is generally beneficial. As such, a benefit of sharpening the image may be achieved without greatly boosting noise.

The incoming signal may be converted from RGB to YUV in the step 202. In a first pass, over a 3×3 subset of the same lowpass filtering (e.g., step 204) neighborhood, an additional simple gradient metric may be computed. A horizontal gradient value (e.g., GRAD_H) and a vertical gradient value (e.g., GRAD_V) may each be computed in the step 206 by applying two 3×3 pixel masks (e.g., GRAD_H_MASK in FIG. 21 and GRAD_V_MASK in FIG. 22) on the luminance component.

A gradient measure value (e.g., GRAD) may be computed as a sum of absolute values of the two gradient components GRAD_H and GRAD_V per equation 12 as follows:

$$GRAD = abs(GRAD\_H) + abs(GRAD\_V) \qquad \text{Eq. (12)}$$

In a second pass, the gradient measure may be applied as follows. At a given pixel location, if the gradient measure is smaller than a threshold gradient value and also all of the adjacent gradient measures in a 3×3 neighborhood are smaller than the threshold gradient value, then alpha may be set to zero. Otherwise alpha may be set to a programmable maximum possible value (e.g., ALPHA_MAXPOS) if (Y−Y_lowpass) is positive, or a maximum negative value (e.g., ALPHA_MAXNEG) otherwise. Purposes of adapting alpha are generally to apply sharpening only to edge regions in the image and to limit an amount of sharpening halos that are usually more objectionable when overshooting on the positive side.

For some applications, position correction may not be feasible. In non-position correcting applications, other processing may be used to reduce binning and skipping artifacts. For example, an annoying binning and skipping artifact of diagonal jagged edges may be reduced by directionally smoothing the image.

The function performed by the flow diagrams of FIGS. 17, 18 and 20 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-opti-

The invention claimed is:

1. A method of operation for a video camera, comprising the steps of:
    (A) sensing an optical signal with a plurality of pixels to generate an input signal, wherein said sensing is capable of a pixel reduction by at least one of binning said pixels and skipping some of said pixels;
    (B) processing said input signal in order to reduce artifacts caused by said pixel reduction to generate an output signal; and
    (C) sharpening a picture formed by said pixels, wherein a first amount of said sharpening performed while said pixel reduction is active differs from a second amount of said sharpening performed while said pixel reduction is inactive.

2. The method according to claim 1, wherein step (B) comprises the sub-steps of:
    changing a spatial position for each of said pixels in said output signal relative to said input signal without changing a spatial size of said picture formed by said pixels; and
    maintaining said spatial position for each of said pixels in said output signal relative to said input signal while said pixel reduction is inactive.

3. The method according to claim 2, wherein said changing causes each of said pixels in said output signal to have substantially equal spatial separation from each other in at least one of (i) a horizontal direction and (ii) a vertical direction.

4. The method according to claim 2, wherein said changing comprises the sub-step of:
    interpolating said pixels in said input signal.

5. The method according to claim 2, wherein step (C) comprises the sub-step of:
    demosaicing said pixels after said changing said spatial position of said pixels.

6. The method according to claim 5, wherein said sharpening of said picture occurs after said demosaicing.

7. The method according to claim 1, wherein said sharpening is performed only on a luminance component for each of said pixels.

8. The method according to claim 1, wherein step (C) comprises the sub-step of:
    directionally smoothing along at least one edge region of said picture formed by said pixels.

9. A video camera comprising:
    a sensor (i) having a plurality of pixels for generating an input signal and (ii) capable of a pixel reduction by at least one of binning said pixels and skipping some of said pixels; and
    a circuit configured to (i) generate an output signal by reducing artifacts in said input signal caused by said pixel reduction and (ii) sharpen a picture formed by said pixels, wherein a first amount of said sharpening performed while said pixel reduction is active differs from a second amount of said sharpening performed while said pixel reduction is inactive.

10. A method of operation for a video camera, comprising the steps of:
    (A) sensing an optical signal with a plurality of pixels to generate an input signal, wherein said sensing is capable of a pixel reduction by at least one of binning said pixels and skipping some of said pixels;
    (B) processing said input signal to generate an output signal, wherein said processing varies in response to both (i) a size of an input picture formed by said input signal and (ii) an on/off condition of said pixel reduction; and
    (C) sharpening a picture formed by said pixels, wherein a first amount of said sharpening performed while said pixel reduction is active differs from a second amount of said sharpening performed while said pixel reduction is inactive.

11. The method according to claim 10, wherein step (B) comprises the sub-steps of:
    changing a spatial position for each of said pixels in said output signal relative to said input signal while said pixel reduction is active without changing a spatial size of said picture formed by said pixels; and
    maintaining said spatial position for each of said pixels in said output signal relative to said input signal while said pixel reduction is inactive.

12. The method according to claim 11, wherein said changing causes each of said pixels in said output signal to have substantially equal spatial separation from each other in at least one of (i) a horizontal direction and (ii) a vertical direction.

13. The method according to claim 11, wherein step (B) further comprises the sub-step of:
    demosaicing said pixels before said changing said spatial position of said pixels.

14. The method according to claim 11, wherein step (C) comprises the sub-step of:
    demosaicing said pixels after said changing said spatial position of said pixels.

15. The method according to claim 14, wherein said sharpening of said picture occurs after said demosaicing.

16. The method according to claim 10, wherein step (B) further comprises the sub-step of:
    converting said pixels to a YUV format.

17. The method according to claim 10, wherein step (C) comprises the sub-steps of:
    demosaicing said pixels; and
    smoothing said picture formed by said pixels after said demosaicing.

18. A video camera comprising:
    a sensor (i) having a plurality of pixels for generating an input signal and (ii) capable of a pixel reduction by at least one of binning said pixels and skipping some of said pixels; and
    a circuit configured to (i) generate an output signal by processing said input signal and (ii) sharpen a picture formed by said pixels, wherein (A) said processing varies in response to both (i) a size of an input picture formed by said input signal and (ii) an on/off condition of said pixel reduction and (B) a first amount of said sharpening performed while said pixel reduction is active differs from a second amount of said sharpening performed while said pixel reduction is inactive.

* * * * *